(12) United States Patent
Rowley et al.

(10) Patent No.: US 8,824,078 B1
(45) Date of Patent: Sep. 2, 2014

(54) RECEIVER CIRCUITS AND METHODS FOR PROCESSING RECEIVED SIGNALS

(71) Applicant: Texas Instruments Incorporated, Dallas, TX (US)

(72) Inventors: Matthew David Rowley, Parker, TX (US); Rajarshi Mukhopadhyay, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/902,657

(22) Filed: May 24, 2013

(51) Int. Cl.
*G11B 5/09* (2006.01)
*H03F 3/45* (2006.01)
*G11B 5/02* (2006.01)

(52) U.S. Cl.
CPC ......................................... *G11B 5/02* (2013.01)
USPC ............................................. 360/46; 330/258

(58) Field of Classification Search
None
See application file for complete search history.

(56) References Cited

U.S. PATENT DOCUMENTS

| | | | | |
|---|---|---|---|---|
| 6,064,261 | A | * | 5/2000 | Stein et al. ..................... 330/252 |
| 7,474,151 | B2 | * | 1/2009 | Gopinathan et al. .......... 330/253 |

* cited by examiner

*Primary Examiner* — Regina N Holder
(74) *Attorney, Agent, or Firm* — John R. Pessetto; Frederick J. Telecky, Jr.

(57) ABSTRACT

Receiver circuits and methods of processing received signals are disclosed herein. An embodiment of a receiver circuit includes a differential input having a first input and a second input and a differential output having a first output and a second output. A first feedback loop is connected to the input and the output, wherein the first feedback loop centers a differential output voltage around a common mode output voltage so that the differential sum is zero centered on the common mode output voltage. The circuit also includes a second feedback loop, wherein the second feedback loop centers the voltage at the first input and the voltage at the second input to a reference voltage.

8 Claims, 2 Drawing Sheets

RECEIVER CIRCUITS AND METHODS FOR PROCESSING RECEIVED SIGNALS

BACKGROUND

The heads of hard disk drives output a differential voltage to a receiver. As the data rates of the hard disk drives increase, conventional receivers encounter several problems. For example, the receivers use manual programming for different options and requirements, such as input bias voltage, gain levels, and offset correction. The characteristics of the hard disk drives change over time, but the programmed requirements are fixed in the hard disk drives. The result is decreased performance of the disk drives over time. For example, variations due to input referred 1/f noise, lifetime drift due to aging, and variance due to temperature and/or voltage all contribute to performance degradation. The programmed requirements in the hard disk drives cannot accommodate for these changes.

Some of the problems described above are compounded by designs of hard disk drives moving toward complementary metal oxide semiconductor (CMOS) technology. In CMOS technologies, the 1/f noise is more predominant, which results in the degradation of the hard disk drives becoming more pronounced. The degradation may cause system failure or yield loss of hard disk drives.

SUMMARY

Receiver circuits and methods of processing received signals are disclosed herein. An embodiment of a receiver circuit includes a differential input having a first input and a second input and a differential output having a first output and a second output. A first feedback loop is connected to the input and the output, wherein the first feedback loop centers a differential output voltage around a common mode output voltage so that the differential sum is zero centered on the common mode output voltage. The circuit also includes a second feedback loop, wherein the second feedback loop centers the voltage at the first input and the voltage at the second input to a reference voltage.

DETAILED DESCRIPTION

Receiver circuits and methods of processing received signals are disclosed herein. The receiver circuits, sometimes referred to simply as receivers, have differential inputs and differential outputs. The receivers may be used as receiver circuits for hard disk drives wherein the differential inputs are connected or coupled to the heads of the hard disk drives. The receivers described herein include two conjoined feedback loops which simultaneously track programmed input voltage bias levels while correcting for output referred offset voltages. Thus, time related variations due to mechanisms in the hard disk drives are tracked and corrected within the loop bandwidth of the receivers.

Figure 1:
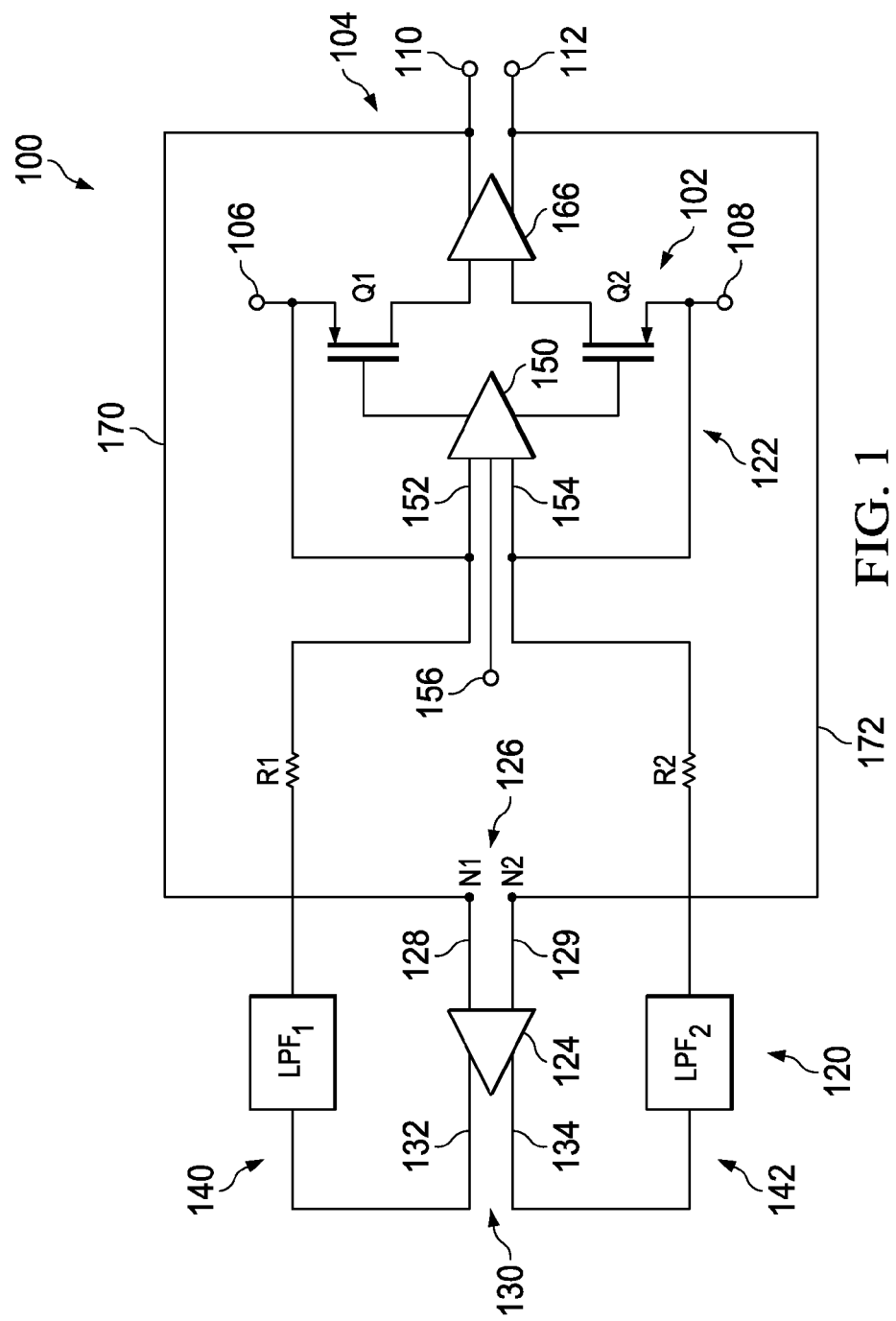
FIG. 1 is a schematic diagram of an embodiment of a receiver circuit.

A schematic diagram of an embodiment of a receiver 100 is shown in FIG. 1. The receiver 100 has a differential input 102 and a differential output 104. The differential input 102 has a first input 106 and a second input 108. Likewise, the differential output 104 has a first output 110 and a second output 112. The differential input 102 may be connected or otherwise coupled to the head (not shown) of a hard disk drive. The head outputs data signals that are processed by the receiver 100. As described below, the receiver 100 centers the input voltage from the head around a common voltage, which may be ground. The receiver 100 outputs the processed data signals to other amplifiers or other processors (not shown in FIG. 1). As further described below, the receiver 100 centers the voltages on the differential outputs 110, 112 around a common mode output voltage so that their differential sum is zero centered on the common mode output voltage, which prevents the receiver 100 from saturating.

The circuit 100 includes two feedback loops, an offset correction loop 120, and a voltage bias loop 122. The offset correction loop 120 includes an amplifier 124 having a differential input 126 with a first input 128 and a second input 129. The amplifier 124 also has a differential output 130 with a first output 132 and a second output 134. The amplifier 124 has a first feedback loop 140 that forms a first low-pass filter LPF1 and a second feedback loop 142 that forms a second low-pass filter LPF2. The first feedback loop 140 is between the first input 128 and the first output 132. The second feedback loop 142 is between the second input 129 and the second output 134. The low-pass filters LPF1 and LPF2 may be second order low-pass filters that attenuate noise and low frequency variations in the output voltage of the receiver 100. The low-pass filters LPF1 and LPF2 may filter the noise on the output 104 so that it is not fed back to the input 102.

The offset correction loop 120 tracks the output differential voltage at the output 104 and corrects for errors. More specifically, the differential voltage at the outputs 110 and 112 is centered on the common mode output voltage for frequencies within the frequency of the offset correction loop 120. Therefore, only the high frequency signals from the head pass to the output 104. Otherwise, the lower frequency noise and the like would likely saturate the receiver 100 and other components to which the output 104 is connected.

The voltage bias loop 122 includes an amplifier or comparator 150 wherein the differential input 102 is connected to or otherwise coupled to the comparator 150 on a first input 152 and a second input 154. The first input 106 of the receiver 100 is connected to the first input 152 and second input 106 of the receiver 100 is connected to the second input 154. The differential input 102 is connected to source coupled field effect transistors (FETs) Q1 and Q2. More specifically, the first input 106 is connected to the source of the FET Q1 and the second input 108 is connected to the source of the FET Q2. The drains of the FETs Q1, Q2 are connected to the inputs of a forward path amplifier 166. The output of the forward path amplifier 166 is the differential output 104 of the receiver 100.

The receiver 100 includes a first feedback line 170 and a second feedback line 172. The first feedback line 170 feeds the first output 110 to a node N1, which is connected to or coupled to the first input 128 of the amplifier 124. The second feedback line 172 feeds the second output 112 to a node N2 that is connected to the second input 129 of the amplifier 124. The node N1 is connected to the first input 106 by way of a resistance R1 and the node N2 is connected to the second input 108 by way of a resistance R2.

The voltage bias loop 122 receives a reference voltage at an input 156 to the comparator 150 and compares the inputs 106, 108 to the reference voltage to ensure that the differential bias is set and that the common mode of the input bias is centered around the reference voltage. In some embodiments, the reference voltage is ground. This reference voltage is sometimes referred to as the common voltage. The common mode setting around ground may be required because hard disk drive platters are grounded internally and thus significant voltage differences from ground could cause arcing and damage the media.

The offset correction loop 120 and the voltage bias loop 122 are conjoined at the differential input 102. Therefore, the errors that are corrected by offset correction loop 120 and the voltage bias loop 122 are both seen by the input 102. The result is optimal voltage offset correction and input voltage correction.

Having described the receiver 100, its operation will now be described. The voltage bias loop 122 centers the input differential voltage around the reference voltage potential, which may be ground. For example, the input 156 to the comparator 150 may be set to ground. The comparator 150 then centers the common mode of the input bias voltage on the first input 106 and the second input 108 around the ground potential at the input 156. As described above, the platter of the hard disk drive is typically grounded, therefore, centering the input voltage around ground prevents arcing on the platter, which could damage the platter and the information stored on the platter.

The receiver 100 feeds the voltages at the output 104 to the offset correction loop 120. The offset correction amplifier 124 corrects for errors in the output voltages. For example, the offset correction amplifier 124 centers the output voltage around a common voltage, which may not be ground. In addition, the low-pass filters LPF1 and LPF2 provide filtering so that noise on the output voltage is not fed back to the inputs 152, 154 of the comparator 150. In some embodiments, the low-pass filters LPF1 and LPF2 provide second order filtering.

The amplifier 124 monitors the voltages at the output 104 and ensures that the difference in the low frequency voltages is zero. Therefore, the difference in the low frequency voltage at the first output 110 and the low frequency voltage at the second output 112 is equal to zero. The use of the low-pass filters LPF1 and LPF2 provides that only high frequency signals, like those output by the head of a hard disk drive, will be observed at the output 104. It is noted that the receiver 100 or other components to which it is connected may have very high gain, which will cause the components to saturate if the low frequency signals are passed to the output 104. A small differential error due to mismatch in the transistors Q1 and Q2 or other problems caused by age or components being out of specification could otherwise cause the saturation. The receiver 100 prevents such saturation.

Figure 2:
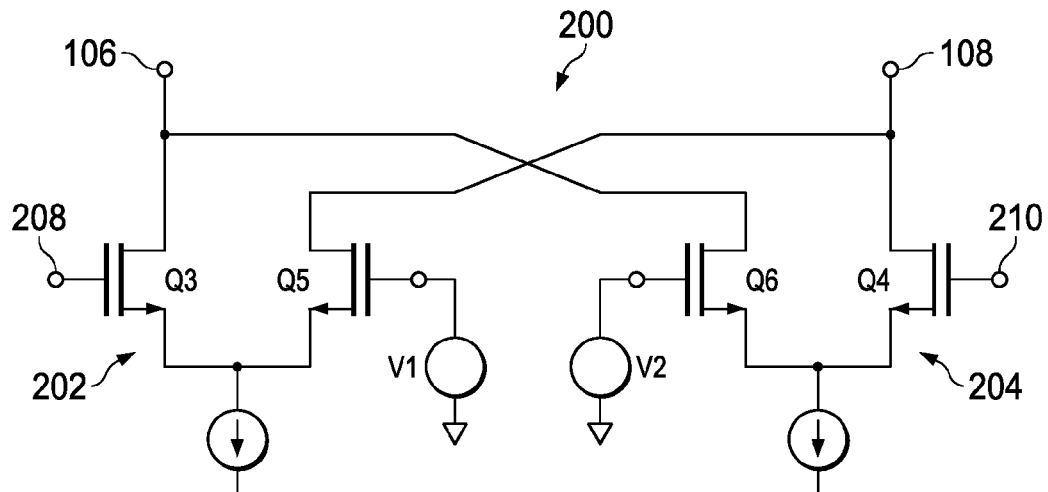
FIG. 2 is a schematic diagram of an alternative embodiment of an input stage for the receiver circuit of FIG. 1.

FIG. 2 is a schematic diagram of an alternative input stage 200 for the receiver 100 of FIG. 1. The input stage 200 is separated into two differential pairs, which are referred to as the first differential pair 202 and the second differential pair 204. The first differential pair 202 includes a common source amplifier consisting of a FET Q3 and the second differential pair includes a common source amplifier consisting of a FET Q4. A first input 208 is connected to the gate of the FET Q3 and a second input 210 is connected to the gate of the FET Q4. The first and second inputs 208, 210 may be connected to the head of the hard disk drive or another signal source. It is noted that an impedance may be connected between the inputs 208, 210 in order to match an input impedance with the impedance of the head. The drain of the FET Q3 is connected to the first input 106 as shown in FIG. 1 and the drain of the FET Q4 is connected to the second input 108.

A first voltage source V1 is connected to the gate of a FET Q5 in the first differential pair 202 and a second voltage source V2 is connected to the gate of a FET Q6 in the second differential pair 204. The first voltage source V1 and the second voltage source V2 serve to overcome the DC voltage difference between the inputs 208, 210, which would otherwise saturate the input stage 200. In order to achieve this result, the voltage of the first voltage source V1 is the average or DC voltage at the first input 208. The voltage of the second voltage source V2 is the average or DC voltage at the second input 210. In some embodiments, the inputs 208, 210 are filtered to generate the DC voltages, which are used as the voltage sources V1 and V2.

Figure 3:
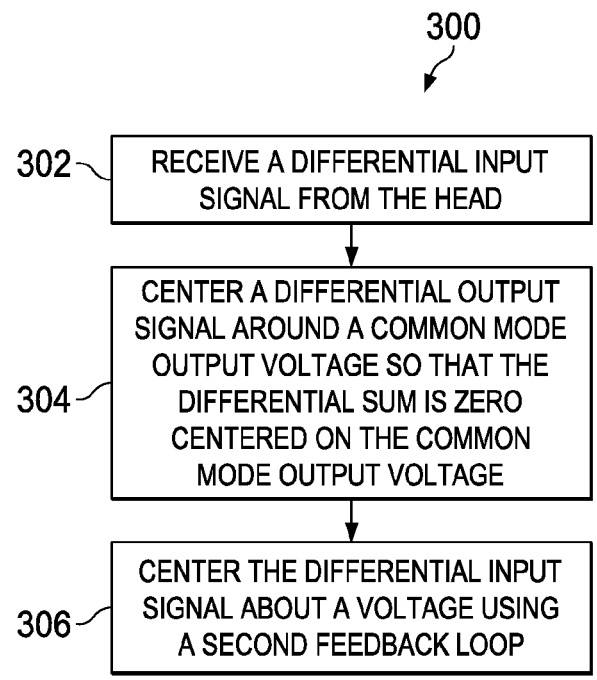
FIG. 3 is a flowchart describing the operation of a receiver circuit.

The operation of a receiver circuit as described herein, such as the circuit 100, using either input stage, can be summarized by the flow chart 300 of FIG. 3. In step 302, a differential input signal from the head of a disk drive is received at the differential input 102. It is noted that the receiver 100 may be used in applications other than hard disk drives, so the differential signal may be input from other sources. In step 304, a differential output signal is centered around a common mode output voltage so that the differential sum is zero centered on the common mode output voltage. In step 306, the differential input signal is centered about a voltage using a second feedback loop.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A receiver circuit comprising:
   a differential input having a first input and a second input;
   a differential output having a first output and a second output;
   a first feedback loop connected to the differential input and the differential output, wherein the first feedback loop centers a differential output voltage around a common mode output voltage so that a differential sum is zero centered on the common mode output voltage;
   a second feedback loop, wherein the second feedback loop centers a differential input voltage at the first input of the receiver circuit and at the second input of the receiver circuit to a reference voltage;
   wherein the second feedback loop comprises a comparator having differential inputs, a first of the differential inputs being connected to the first input of the receiver circuit and a second of the differential inputs being connected to the second input of the receiver circuit.

2. The circuit of claim 1, wherein the comparator has a reference input wherein the reference voltage is input at the reference input.

3. The circuit of claim 2, wherein the reference input is connected to ground.

4. The circuit of claim 1, wherein the comparator comprises a feedback loop.

5. The circuit of claim 1, wherein the comparator comprises a feedback loop having a FET in the feedback loop, a source of the FET being connected to the first input of the receiver circuit, and a gate of the FET being connected to an output of the comparator.

6. The circuit of claim 5 and further comprising a forward path amplifier having a differential output which is connected to the differential output of the receiver circuit; a drain of the FET being connected to an input of the forward path amplifier.

7. The circuit of claim 1 and further comprising a forward path amplifier connected to the output of the comparator.

8. A method for processing a signal received from a head of a hard disk drive, the method comprising:
- receiving a differential input signal from the head;
- using a first feedback loop to center a differential output signal around a common mode output voltage so that a differential sum is zero centered on the common mode output voltage; and
- centering the differential input signal about a reference voltage using a second feedback loop;
- wherein the receiving a differential input signal comprises receiving a first input signal and a second input signal, and wherein the centering comprises using a comparator to compare the first input signal and the second input signal to a reference voltage.

* * * * *